No. 838,236. PATENTED DEC. 11, 1906.
L. BURRELL.
MILKING MACHINE.
APPLICATION FILED JULY 31, 1906.

2 SHEETS—SHEET 1.

Witnesses:
E. A. Volk
A. G. Dimond

Inventor.
Loomis Burrell
By Wilhelm, Parker & Ward
Attorneys.

No. 838,236. PATENTED DEC. 11, 1906.
L. BURRELL.
MILKING MACHINE.
APPLICATION FILED JULY 31, 1906.
2 SHEETS—SHEET 2.
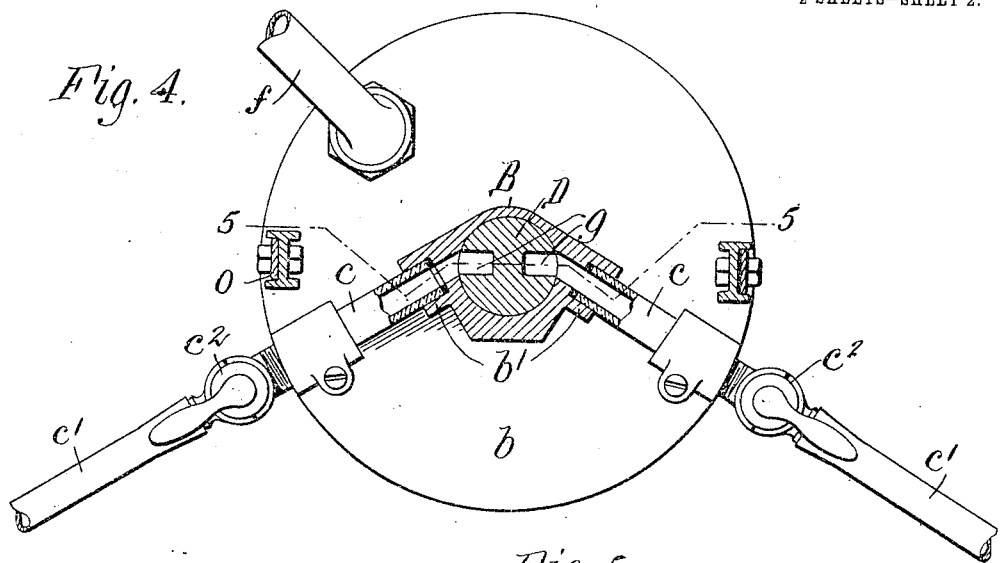
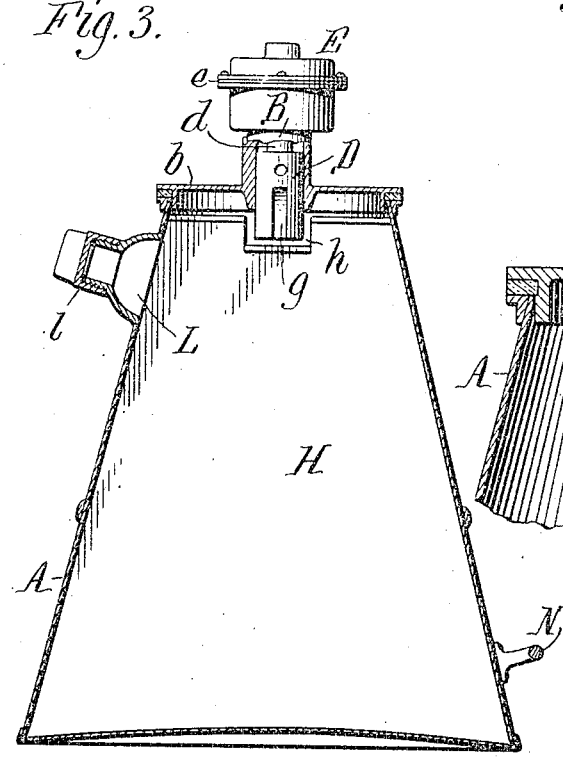
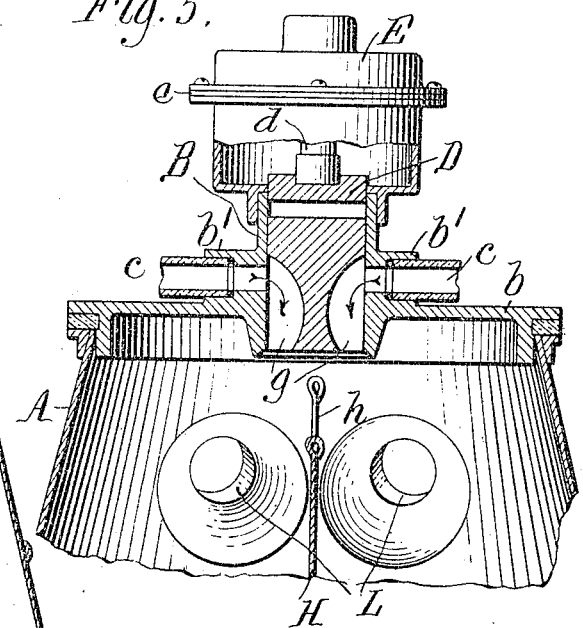
Witnesses:
E. A. Vock.
A. G. Dimond.
Inventor.
Loomis Burrell,
By Wilhelm, Parker & Hard
Attorneys.

UNITED STATES PATENT OFFICE.

LOOMIS BURRELL, OF LITTLE FALLS, NEW YORK, ASSIGNOR TO D. H. BURRELL & COMPANY, OF LITTLE FALLS, NEW YORK.

MILKING-MACHINE.

No. 838,236.　　　　Specification of Letters Patent.　　　　Patented Dec. 11, 1906.

Application filed July 31, 1906. Serial No. 328,546.

*To all whom it may concern:*

Be it known that I, LOOMIS BURRELL, a citizen of the United States, residing at Little Falls, in the county of Herkimer and State of New York, have invented a new and useful Improvement in Milking-Machines, of which the following is a specification.

This invention relates to that class of milking-machines in which the milk pail or receiver is connected with milking contrivances for milking two cows simultaneously. Heretofore the milk so drawn from two cows was commingled in the pail or receiver; but it is often desirable to keep the milk from each cow separate in order that the yield of each individual cow can be ascertained and recorded both as to weight and quality.

The object of my invention is to provide simple and convenient means for effecting this result.

Figure 1:
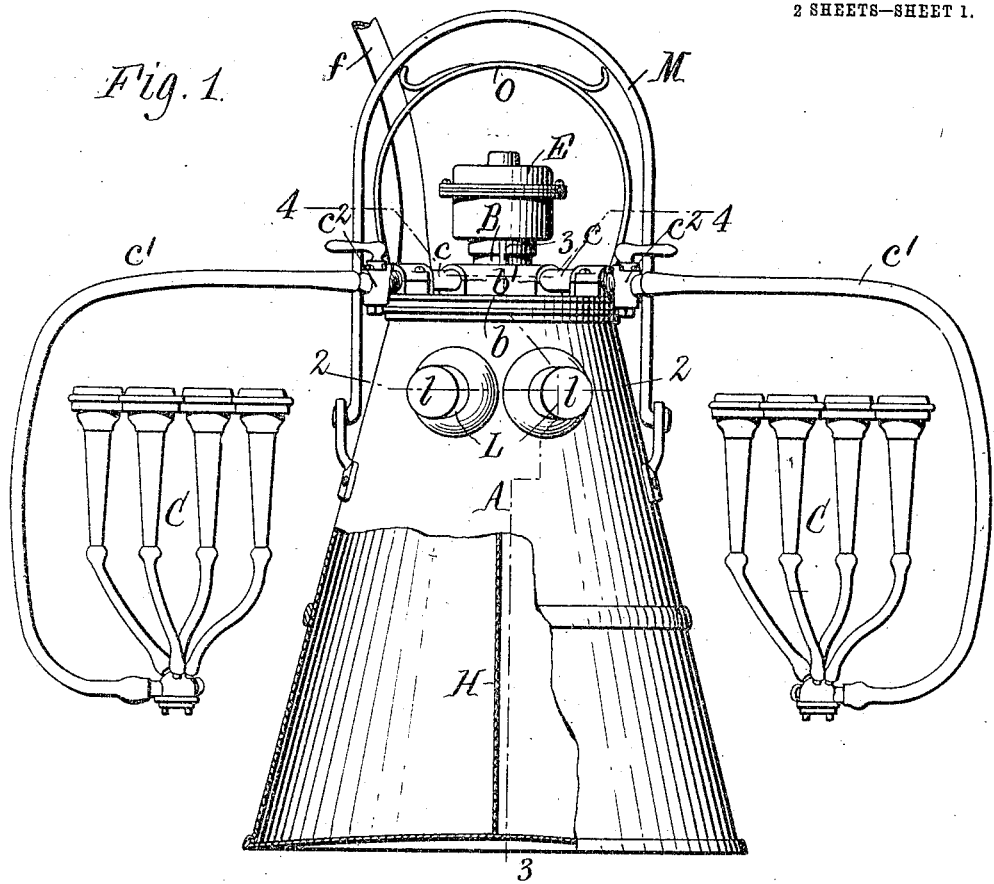
Figure 2:
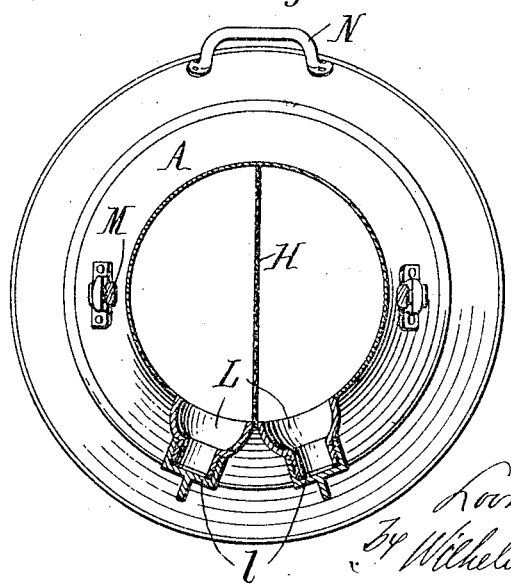

In the accompanying drawings, consisting of two sheets, Figure 1 is a sectional elevation of a milking-machine provided with my improvement. Fig. 2 is a horizontal section in line 2 2, Fig. 1. Fig. 3 is a vertical section at right angles to Fig. 1 in line 3 3 in that figure. Fig. 4 is a horizontal section through the pulsator in line 4 4, Fig. 1, on an enlarged scale. Fig. 5 is a vertical section through the pulsator in line 5 5, Fig. 4.

Like letters of reference refer to like parts in the several figures.

The milking-machine to which my improvement is applied, as represented in the drawings, is of the general type which is shown and disclosed in my Letters Patent No. 784,780, March 14, 1905, which type is selected for convenience in illustrating the invention; but the invention in its broad aspect is also applicable to other styles of milking-machines.

A represents the milk pail or receiver upon which the milking contrivances, suitable for milking two cows simultaneously, are mounted. These milking contrivances may be of any suitable construction and comprise, briefly stated, and so far as shown in the drawings, a top plate $b$, which covers the pail and is tightly but removably secured thereto; an upright pulsator-cylinder B, mounted centrally on said top plate and having two oppositely-extending nipples $b'$ with which the two milk-pipes connect which lead to the teat-cups C and which are preferably each composed of a glass tube $c$, a rubber hose $c'$, and a cock $c^2$; a pulsator-piston or valve D, which is moved up and down in the cylinder and which is connected by a rod $d$ with a flexible diaphragm $e$ in a casing E above the cylinder; and a suction-pipe $f$, which connects the pail or receiver with the exhaust or vacuum mechanism.

The pulsator piston or valve D is provided with two separate ports or channels $g$, Figs. 3, 4, and 5, which in the upper position of the piston (shown in Figs. 4 and 5) coincide with the nipples $b'$ and the milk-pipes and open downwardly into the pail or receiver A, so that the suction applied to the milk-pail operates through the ports or channels $g$ and the milk-pipes upon the two sets of teat-cups, while the milk from each cow passes separately through each pipe and the corresponding port or channel $g$ to the pail.

When the piston or valve D is in its lower position, (represented in Fig. 3,) the ports or channels $g$ are out of line with the nipples, and the communication between the exhausted milk-pail and the milk-pipes and teat-cups is cut off, thereby cutting off the suction from the teat-cups.

The pail or receiver is provided with a partition H, which divides the pail into two compartments, side by side, and which extends as nearly to the top of the pail as practicable, the partition having preferably a central notch or depression $h$ in its upper edge to clear the pulsator-piston in the lower position of the latter. The two milk ports or channels $g$ of the pulsator piston or valve are arranged on opposite sides of this partition, so that the milk is discharged from each port into the corresponding compartment of the pail, thus keeping the milk from each cow separate.

For discharging the milk from each compartment of the pail separately and conveniently the pail is provided near its top with two discharge-spouts L, which are preferably provided with removable caps or stoppers $l$. These spouts are arranged side by side on the same side of the pail and on opposite sides of the partition, but near the latter, and preferably diverge outwardly. The milk contained in the pail is readily poured out separately from each compartment through these spouts into two ordinary pails or vessels placed side by side, whereby the milk from each cow is conveniently transferred into a separate pail, in which the milk can be measured, weighed, or otherwise examined.

The pail A is provided with the usual bail M and handle N for manipulating it, and the plate b of the pulsator is provided with the usual bail O.

I claim as my invention—

1. In a milking-machine, the combination of a receiving-pail having milk-compartments arranged side by side and a milking mechanism mounted on said pail and provided with means for milking two cows simultaneously, said milking mechanism having two separate milk-passages, each opening into one of said compartments, substantially as set forth.

2. In a milking-machine, the combination of a receiving-pail having milk-compartments arranged side by side and a milking mechanism mounted on said pail and provided with means for milking two cows simultaneously, said milking mechanism comprising a pulsator-valve having two separate milk-passages, each opening into one of said compartments, substantially as set forth.

3. In a milking-machine, the combination of a receiving-pail having an upright partition dividing the pail into two compartments, and a pulsator-valve arranged above said partition and provided with separate milk-passages, opening into the pail on opposite sides of said partition, substantially as set forth.

4. In a milking-machine, the combination of a receiving-pail having an upright partition dividing the pail into two compartments, an upright pulsator-cylinder arranged above said partition, and a vertically-movable pulsator-piston arranged in said cylinder and provided with separate milk-ports on opposite sides of said partition, substantially as set forth.

5. In a milking-machine, the combination of a receiving-pail having milk-compartments arranged side by side and a separate discharge-spout for each compartment, and a milking mechanism mounted on said pail and provided with means for milking two cows simultaneously and with separate milk-passages, one for each compartment, substantially as set forth.

6. In a milking-machine, the combination of a receiving-pail having an upright partition dividing the pail into two compartments and having discharge-spouts on opposite sides of said partition, and a pulsator mechanism mounted on said pail and having separate milk-passages opening into said pail on opposite sides of said partition, substantially as set forth.

7. In a milking-machine, the combination of a receiving-pail having an upright partition dividing the pail into two compartments and having discharge-spouts arranged side by side on the same side of the pail near the top thereof and on opposite sides of said partition, and means for delivering the milk from two cows separately into the pail on opposite sides of said partition, substantially as set forth.

Witness my hand this 27th day of July, 1906.

LOOMIS BURRELL.

Witnesses:
F. A. LANE,
GEO. W. BELLINGER.